US012156321B2

(12) United States Patent
Weber et al.

(10) Patent No.: US 12,156,321 B2
(45) Date of Patent: Nov. 26, 2024

(54) METHOD AND SYSTEM FOR CALIBRATING AN X-RAY EMITTER

(71) Applicant: Siemens Healthcare GmbH, Erlangen (DE)

(72) Inventors: Thomas Weber, Hausen (DE); Anja Fritzler, Erlangen (DE); Steffen Kappler, Effeltrich (DE); Ralf Nanke, Neunkirchen am Brand (DE); Ludwig Ritschl, Buttenheim (DE); Marcus Radicke, Veitsbronn (DE); Ferdinand Lueck, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 95 days.

(21) Appl. No.: 17/952,518

(22) Filed: Sep. 26, 2022

(65) Prior Publication Data

US 2023/0098560 A1 Mar. 30, 2023

(30) Foreign Application Priority Data

Sep. 28, 2021 (DE) ..................... 10 2021 210 851.2

(51) Int. Cl.
*H05G 1/52* (2006.01)
*H05G 1/26* (2006.01)

(52) U.S. Cl.
CPC ............... *H05G 1/52* (2013.01); *H05G 1/265* (2013.01)

(58) Field of Classification Search
CPC .......... H01J 35/153; H01J 35/06; H01J 35/30; H01J 35/14; H01J 35/305; H01J 2235/10;
(Continued)

(56) References Cited

U.S. PATENT DOCUMENTS

| | | | | |
|---|---|---|---|---|
| 6,292,538 B1 * | 9/2001 | Hell | A61B 6/4021 | 378/138 |
| 2004/0190682 A1 * | 9/2004 | Deuringer | H05G 1/52 | 378/137 |

(Continued)

FOREIGN PATENT DOCUMENTS

| | | |
|---|---|---|
| DE | 10301068 A1 | 7/2004 |
| DE | 102006046734 A1 | 4/2008 |

(Continued)

*Primary Examiner* — Irakli Kiknadze

(74) *Attorney, Agent, or Firm* — Harness, Dickey & Pierce, P.L.C.

(57) ABSTRACT

One or more example embodiments relates to a method for calibrating an X-ray emitter having a cathode, an anode and a coil, wherein the coil is connected to a conductor arrangement through which an electrical function current is guided through the coil. The method comprises measuring an induction current that is induced in the coil at the conductor arrangement of the coil; calculating a compensation current for an effecting coil of the X-ray emitter based on the measured induction current, the effecting coil configured to change an electron beam between the cathode and the anode, wherein the compensation current is calculated such that a magnetic field that induces the induction current during the measuring is compensated using a magnetic field that is produced by the compensation current in the effecting coil; and applying the compensation current in the effecting coil.

20 Claims, 3 Drawing Sheets

(58) Field of Classification Search

CPC .... H01J 35/10; H01J 35/16; H01J 9/00; H01J 2235/166; H01J 35/064; H01J 35/08; H01J 35/101; H01J 29/98; H01J 35/112; H01J 35/24; H01J 35/26; H01J 2235/168; H05G 1/265; H05G 1/52; H05G 1/30; H05G 1/04; H05G 1/66; A61B 6/02; A61B 6/025; A61B 6/4021; A61B 6/4028; A61B 6/502; A61B 6/54; A61B 6/582; A61B 6/4035; A61B 6/4085; A61B 6/4208; A61B 6/482; A61B 6/583; A61B 6/08; A61B 6/547; A61B 6/032; A61B 6/40; A61B 6/461; A61B 34/70; A61B 34/73; A61B 6/586; A61B 6/587; A61B 2090/376; A61B 6/06; H04N 3/18; H04N 3/26

USPC .................................. 378/119, 137, 139, 207

See application file for complete search history.

(56) References Cited

U.S. PATENT DOCUMENTS

| | | | |
|---|---|---|---|
| 2004/0208287 A1 | 10/2004 | Deuringer | |
| 2008/0080664 A1 | 4/2008 | Bernhardt et al. | |
| 2018/0261420 A1 | 9/2018 | Holch et al. | |
| 2023/0238204 A1 * | 7/2023 | Hansson .............. | A61B 6/4021 378/62 |

FOREIGN PATENT DOCUMENTS

| | | | |
|---|---|---|---|
| DE | 102017203932 A1 | 9/2018 | |
| EP | 3093867 A1 * | 11/2016 | ............ H01J 35/025 |

* cited by examiner

METHOD AND SYSTEM FOR CALIBRATING AN X-RAY EMITTER

CROSS-REFERENCE TO RELATED APPLICATION(S)

The present application claims priority under 35 U.S.C. § 119 to German Patent Application No. 102021210851.2, filed Sep. 28, 2021, the entire contents of which are incorporated herein by reference.

FIELD

One or more example embodiments of the present invention relates to a method and a system for calibrating an X-ray emitter, an X-ray emitter of this type or a control facility and a corresponding X-ray system, such as for tomosynthesis. For example, one or more example embodiments of the present invention relates to a calibration method for a magnetic deflecting system of an X-ray emitter.

BACKGROUND

In the case of tomographic methods of X-ray diagnostics, in recent years a method is used that is known by the name "flying focal spot" (FFS). In the case of this method, the electron beam, which originates from the cathode, of an X-ray emitter is deflected by a magnetic field, which is generated for example by a magnetic coil, prior to the impingement of the electron beam on the anode. As a consequence, it is possible to change the impingement point of the electron beam on the anode surface. FFS is used inter alia in mammography.

The principle of FFS can be used so as to pivot an X-ray beam in a targeted manner over a region or in order to compensate a location deviation of an X-ray beam. In order to achieve a periodic movement of the X-ray beam, the magnetic coil can be influenced using a periodic deflecting current. At present, a deflecting current is frequently assumed as a periodic function having a periodic length of for example 200 ms (for example as a sawtooth function).

In the case of a rotating X-ray emitter, such as the X-ray emitter used for example in the case of tomosynthesis in mammography, FFS in particular has the function during the exposure time of an object (for example 40 ms or 70 ms) of compensating the mechanical movement of the X-ray emitter in the space by an opposing movement of the focal spot with the result that this object appears to be stationary during a projection.

However in this regard it is to be noted that beyond the above-mentioned magnetic coil there are further deflecting systems in the X-ray emitter, which act in a magnetic manner and are used for example for electron beam focusing or so as to drive a rotary anode. In this regard, it is to be noted that essentially each current that flows (for example in an electric motor) generates a magnetic field and moving electrons are deflected owing to magnetic fields. For example, the (periodic) magnetic field of a rotary anode drive in general also penetrates as far as into the region of the electron beam of the X-ray emitter and causes a periodic deflection of the electrons and as a consequence a circular movement of the main focus of the focal spot of the X-ray radiation at the rotary frequency of the rotary anode drive (for example 160 Hz). This movement leads to a disadvantageous enlargement of the focal spot.

SUMMARY

At present, magnetic fields are passively shielded as well as possible from the electron beam but this causes a construction outlay and also additional costs and often does not completely shield these fields.

One ore more example embodiments provide an improved method and a corresponding system for calibrating an X-ray emitter with which the above-described disadvantages are avoided and in particular a magnetic deflecting system can be calibrated in an X-ray emitter.

One or more example embodiments relates to a method for calibrating an X-ray emitter having a cathode, an anode and a coil, wherein the coil is connected to a conductor arrangement through which an electrical function current is guided through the coil. The method comprises measuring an induction current that is induced in the coil at the conductor arrangement of the coil; calculating a compensation current for an effecting coil of the X-ray emitter based on the measured induction current, the effecting coil configured to change an electron beam between the cathode and the anode, wherein the compensation current is calculated such that a magnetic field that induces the induction current during the measuring is compensated using a magnetic field that is produced by the compensation current in the effecting coil; and applying the compensation current in the effecting coil.

According to one or more example embodiments, the measuring measures the induction current at the effecting coil while an effecting current is not flowing.

According to one or more example embodiments, the effecting coil is a flying focal spot (FFS) magnetic coil, the FFS magnetic coil is configured to deflect the electron beam and the calculating calculates the compensation current such that a magnetic field that induces an induction current in the FFS magnetic coil during the measuring is compensated using a magnetic field that is produced by the compensation current in the FFS magnet coil.

According to one or more example embodiments, the effecting coil is a focusing coil, the focusing coil is configured to focus the electron beam, and the calculating calculates the compensation current such that a magnetic field that induces an induction current in the focusing coil during the measuring is compensated using a magnetic field that is produced by the compensation current in the focusing coil.

According to one or more example embodiments, the method includes applying the compensation current with an effecting current in the effecting coil, wherein the effecting current excites the effecting coil.

According to one or more example embodiments, the method further includes periodically applying the effecting current by the coil, wherein the measuring measures the induction current during a rest time between the applying, and the calculating calculates the compensation current after the measuring and during the applying.

According to one or more example embodiments, the measuring includes determining a phase of the induction current, and the applying applies the compensation current in synchronization with the determined phase.

According to one or more example embodiments, the calculating calculates the compensation current during at least one of a production of the X-ray emitter, during an examination or between two examinations.

According to one or more example embodiments, a system for calibrating an X-ray emitter having a cathode and an anode includes a conductor arrangement configured to connect to a coil such that a function current can be guided through the coil; a measuring unit configured to measure an induction current at the conductor arrangement, the induction current being induced in the coil that is connected to the conductor arrangement; and a calibration unit configured to calculate a compensation current for an effecting coil of the X-ray emitter based on the measured induction current, the effecting coil configured to change an electron beam between the cathode and the anode, wherein the compensation current is calculated such that a magnetic field that induces the induction current during the measurement is compensated using a magnetic field that is produced by the compensation current in the effecting coil, and wherein the compensation unit is configured to apply the compensation current in the effecting coil.

According to one or more example embodiments, the effecting coil is between the cathode and the anode within or outside of a housing of the X-ray emitter.

According to one or more example embodiments, the effective coil is a focusing coil configured to focus the electron beam from the cathode to the anode.

According to one or more example embodiments, the conductor arrangement is configured to provide the measurement of the induction current, application of an effecting current and the application of the compensation current.

According to one or more example embodiments, the calibration unit is coupled in a signal-technical manner to a control of a rotary anode drive or the calibration unit is configured to measure the rotation of the rotary anode drive, the calibration unit is configured to apply the compensation current in a phase-correct manner to the rotary anode drive.

According to one or more example embodiments, an X-ray emitter or control facility comprises a system according to one or more example embodiments.

According to one or more example embodiments, an X-ray system comprises a system according to one or more example embodiments.

BRIEF DESCRIPTION OF THE DRAWINGS

Features are explained below with reference to the attached figures with the aid of exemplary embodiments. In this case, in the various figures identical components are provided with identical reference numerals. The figures are in general not to scale. In the drawings.

DETAILED DESCRIPTION

Figure 1:
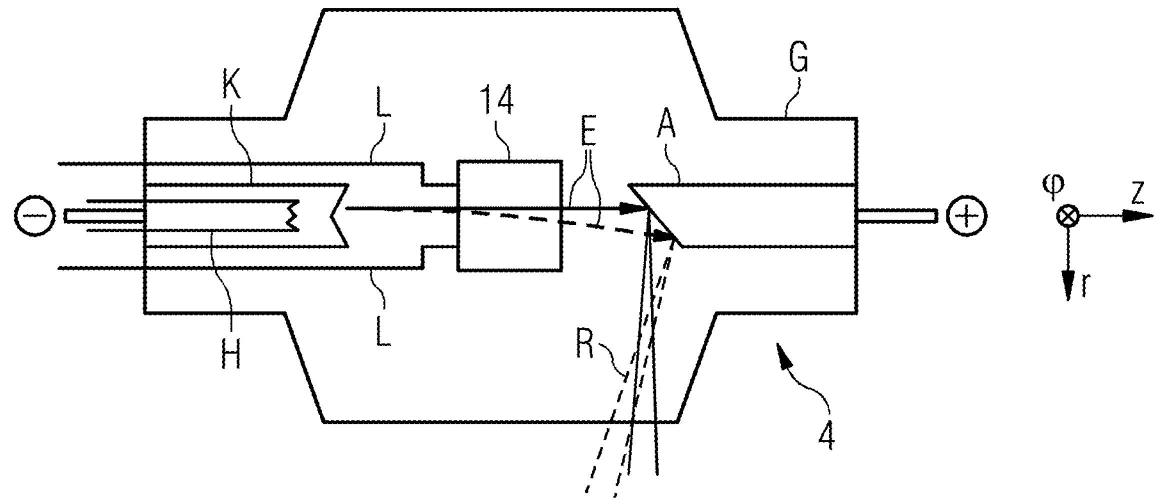
FIG. 1 shows a schematic illustration of an X-ray emitter in accordance with the prior art.

A method in accordance with at least one example embodiment of the present invention is used so as to calibrate an X-ray emitter. An X-ray emitter of this type is essentially known to the person skilled in the art and comprises an X-ray tube (the vacuum component of the X-ray emitter) and as function elements a cathode, an anode and a coil (for example for deflecting or focusing the electron beam). In this case, the coil can be arranged within or outside of the X-ray tube and is connected to a conductor arrangement through which, in order to fulfill the primary function of the coil, an electrical function current is guided through the coil. The primary function can be for example the deflection or focusing of the electron beam between the cathode and the anode.

The method comprises the following steps:

- measuring an induction current that is induced in the coil at the conductor arrangement of the coil, preferably while the function current is switched off,
- calculating a compensation current for an effecting coil of the X-ray emitter, the primary function of which is to change an electron beam between the cathode and the anode, based on the measured induction current, wherein the compensation current is calculated so that (at least) a magnetic field, which induced the induction current during the measurement, is compensated using the magnetic field that is produced by the compensation current in the effecting coil,
- applying the compensation current in the effecting coil.

In this case, it is to be noted that the coil at which the measurement is performed is preferably also the effecting coil, it is however not necessarily so in every case. However, all the calculations that are performed are much simpler (and the compensation is better) if the coil at which the measurement is performed is also the effecting coil (and therefore the function current is also the effecting current). "Clearly identifiable" designations have therefore been used in order to make it clear in the following description which coil and which current is discussed at the time.

The term "effecting coil" is intended to mean a coil, the primary function of which is to influence the electron beam, for example focus (using a focusing coil) or deflect (for example using an FFS magnetic coil). Using the effecting current, a magnetic field is generated in the effecting coil and thereby its primary function is fulfilled. The term "coil" is intended to mean a coil in general. In this case this can be throughout the effecting coil; however it is not necessarily so. A magnetic field is generated in the coil using the function current for the primary function. If the coil is an effecting coil, the function current is the effecting current.

The induction current is the measured current that is induced in the coil by an external magnetic field. The compensation current is the current that is used so as to compensate the influence of the external magnetic field.

The measurement of the induction current should be performed while the function current is switched off. However, the function current can theoretically also be switched on. In this case however, precautions must be taken (hardware or software) in order to filter out or to separate the induction current from the measured signal that in this case also contains the function current.

A simple measurement without the function current can be achieved by virtue of the fact that after the function current is switched on for the primary function of the coil this function current is switched off again prior to a measurement. It is also possible to check whether a current is flowing through the coil or not (or only a small current). In this case, it should be noted that the induction current is in general much smaller than the function current. However, a switch can also be provided that alternately connects the conductor arrangement of the coil to a current source and a measuring unit.

The calculation of the compensation current for the effecting coil of the X-ray emitter is particularly simple if the coil at which the measurement is performed is also simultaneously the effecting coil since in this case the intensity of the compensation current also corresponds to the intensity of the induction current, wherein the sign of the compensation current is however inverted in order to counteract the external magnetic field.

If the coil at which the measurement is performed is however not the effecting coil, the calculation of the compensation current is more complicated. In practice, in parallel with a measurement of the induction current in the coil, beforehand a simultaneous measurement of a comparison current can be performed at the effecting coil and a function between the induction current and comparison current can be determined therefrom. This function then specifies what influence magnetic fields have on the effecting coil in the case of a measured induction current. The compensation current then corresponds to the negative comparison current and is provided from the determined function. The function can however also be determined by simulations or calculations. If for example in the case of the pre-measurement it is determined that at the effecting coil a comparison current is always measured that is twice as large as the induction current that is measured at the coil, it is therefore necessary after the measurement of the induction current to use twice its value for the calculation of the compensation current.

The aim in this case is always that the compensation current generates a magnetic field that is equal to (or is at least similar to) the inverted magnetic field that prevails in the case of the measurement at the effecting coil.

Since a coil is used for the measurement, the measured induction currents are currents that have been induced by magnetic alternating fields. These alternating fields during normal operation of an X-ray emitter for the most part have a periodic curve and originate for example from magnetic deflecting systems, systems for electron beam focusing or the drive of a rotary anode.

When the compensation current is applied in the effecting coil, this compensation current is preferably applied together with the effecting current. Since the compensation current in general is much smaller than the effecting current, this can be provided owing to modulation of the effecting current in which the compensation current is modulated simply as a signal to the effecting current.

A system in accordance with one or more example embodiments of the present invention for calibrating an X-ray emitter having a cathode and an anode is preferably designed so as to perform this method. The system comprises the following components:

a conductor arrangement that is designed so as to connect to a coil so that a function current can be guided through the coil in order to fulfill the primary function of the coil, a measuring unit that is designed so as to measure an induction current, which is induced in a coil that is connected to the conductor arrangement, at the conductor arrangement, in particular while a current is not flowing through the conductor arrangement, a calibration unit that is designed so as to calculate a compensation current for an effecting coil of the X-ray emitter, the primary function of which is to change an electron beam between the cathode and the anode, based on the measured induction current, wherein the compensation current is calculated so that a magnetic field, which induced the induction current during the measurement, is compensated using the magnetic field that is produced by the compensation current in the effecting coil, and wherein the compensation unit is designed so as to apply the compensation current in the effecting coil.

Together with the conductor arrangement, the system can also comprise the coils, for example in which an X-ray emitter is connected to the system. This coil is required for the measurement since otherwise it is not possible to measure an induction current. Since the coil or the X-ray emitter can be however a replacement part, it is not absolutely necessary for the coil or X-ray emitter to belong to the system. The system can be for example part of a control facility for an X-ray system or part of an X-ray emitter.

One or more example embodiments of the present invention in this case can blend harmoniously into the sequence of a conventional X-ray examination as is illustrated in the example of an FFS examination. A deflecting current (the effecting current) is applied in an FFS magnetic coil (which represents the effecting coil here) in order to cause the deflection of the electron beam. In the case of the FFS, a deflection is however only necessary at the point in time that the beam is triggered. In the prior art however, the FFS magnetic coil is operated continuously using a sawtooth deflecting current. One or more example embodiments of the present invention can however now be applied in the times when beam deflection is not necessary. In these times, the measurement of the induction current at the FFS magnetic coil is performed and consequently in this measuring time the magnet system is operated as a magnetic field sensor in order to measure the disruptive magnetic fields during operation and by adapting the deflecting current using the compensation current. This compensation then represents a calibration of the resulting X-ray beam.

The advantage of this invention is an effective active compensation of disruptive (residual) magnetic fields.

An X-ray emitter in accordance with one or more example embodiments of the present invention comprises a system in accordance with one or more example embodiments of the present invention.

A control facility in accordance with one or more example embodiments of the present invention for an X-ray system comprises a system in accordance with one or more example embodiments of the present invention.

An X-ray system in accordance with one or more example embodiments of the present invention comprises a system in accordance with one or more example embodiments of the present invention, in particular an X-ray emitter in accordance with one or more example embodiments of the present invention or a control facility in accordance with one or more example embodiments of the present invention and is preferably designed so as to implement a method in accordance with one or more example embodiments of the present invention.

Further particularly advantageous embodiments and developments of one or more example embodiments of the present invention are provided in the dependent claims and also the following description, wherein the claims of one claim category can also be developed in a similar manner to claims and description parts of another claim category and in particular also individual features of various exemplary embodiments or variants can be combined to form new exemplary embodiments or variants.

In accordance with a preferred method, the measurement of the induction current is performed at the effecting coil while an effecting current is not flowing. The above-mentioned coil is in other words the effecting coil at which the induction current is measured while an effecting current is not flowing. The compensation current in this case is preferably according to the above described simple calculating method directly the negative induction current.

In accordance with a preferred method, the effecting coil is an FFS magnetic coil, the primary function of which is to deflect the electron beam within the scope of a flying focal spot method. The compensation current is preferably calculated so that a magnetic field, which induced the induction current in the FFS magnetic coil during the measurement, is compensated using the magnetic field that is produced by the compensation current in the FFS magnetic coil. This has the advantage that an influence of external magnetic fields on the deflection of the electron beam is actively compensated.

In accordance with a preferred method, the effecting coil is a focusing coil, the primary function of which is a focusing of the electron beam, and wherein the compensation current is calculated so that a magnetic field, which induced the induction current in the focusing coil during the measurement, is compensated using the magnetic field that is produced by the compensation current in the focusing coil. As a consequence, it is possible to effectively actively compensate the influence of external magnetic fields on the focusing of the electron beam.

In accordance with a preferred method, the compensation current is applied together with an effecting current in the effecting coil, wherein the effecting current excites the primary function of the effecting coil. This can be provided in a simple manner by virtue of the fact that the compensation current is modulated to the effecting current. In this case, it is preferred that the compensation current is applied together with a deflecting current so as to deflect the electron beam (as an effecting current) in the FFS magnetic coil.

In accordance with a preferred method, the function current is periodically applied and switched off. Between switching off and applying the function current in this case a rest time exists in which function current does not flow through the coil and the measurement is performed during this rest time. In this case, it is preferred that the compensation current is calculated after the measurement and in particular is applied in the time while an effecting current is switched on. It is preferred that the function current is an effecting current, for example the above-mentioned deflecting current. In contrast with the prior art in which in general a deflecting current is applied in the form of a sawtooth, preferably in contrast thereto the sawtooth is only applied at times at which a deflection is also necessary and the current is switched off in the intermediate times for the measurements.

In accordance with a preferred method, in the case of the measurement of the induction current, its phase is additionally determined. The compensation current is then synchronously applied to the determined phase. This is advantageous in the case of periodic external magnetic alternating fields, for example the interference field, that is produced by the drive of the rotary anode. This alternating field can only then be optimally compensated if the compensation occurs in a phase synchronous manner. This is achieved by the phase synchronous application of the compensation current. It is therefore preferred here that in the case that a component, in particular a rotary anode drive, of the X-ray emitter induces a magnetic field, the compensation current is applied in a phase-correct manner to the magnetic field of this component (obviously so that the magnetic field that is generated by the component is opposite the magnetic field of the component).

In accordance with a preferred method, the calculation of the compensation current is performed during the production of the X-ray emitter. In this case, it is assumed that the interference fields do not change during normal operation and are the same as measured during the production. Alternatively or in addition thereto, the method is implemented during the operation in the case of an examination or between two examinations. In this case, it is preferred that a data set is stored for the compensation current (for example its intensity and curve over time). This data set is then available for the calibration.

In accordance with a preferred system, the effecting coil is arranged between the cathode and the anode (in the interior of the X-ray tube or outside). The effecting coil is in this case preferably an FFS magnetic coil for deflecting an electron beam from the cathode to the anode within the scope of a flying focal spot method and is particularly preferably designed for the controlled guiding of an X-ray beam on a line or the controlled overlap of a surface.

In accordance with a preferred system, the effecting coil is a focusing coil for focusing an electron beam from the cathode to the anode.

A preferred system is designed so that the measurement of the induction current, the application of the effecting current and the application of the compensation current, in particular together with the effecting current, is provided via the same conductor arrangement.

The case of mammography is to be mentioned as an exemplary embodiment. A preferred X-ray system is here in other words a mammography system. A mammography examination is performed for example using an image refresh rate of 5 images per second. The actual X-ray window is however only for example 70 ms long of the 200 ms. The detector is only ready in this time to detect X-ray radiation. In the remaining 130 ms, X-ray radiation is not generated and consequently also an electron beam does not move from the cathode to the anode. In the prior art, hitherto the deflecting current of the FFS magnetic coil is applied as a periodic sawtooth function having a period length of 200 ms. In accordance with one or more example embodiments of the present invention, after the termination of the X-ray window, the deflecting current is switched off in order to use the magnet system in this time period as a measuring system in accordance with the method in accordance with one or more example embodiments of the present invention, in other words in order to detect external interference magnetic fields and to compensate their influence in future recordings.

It is preferred that the calibration unit is coupled in a signal-technical manner to the control of a rotary anode drive or measures the rotation of the rotary anode. The calibration unit is then preferably designed so as to apply the compensation current in a phase-correct manner to the rotary anode drive so that the measured interference field of the rotary anode drive is correctly compensated.

FIG. 1 illustrates a schematic illustration of an X-ray emitter 4 in accordance with the prior art. A cathode K and an anode A are arranged in a vacuum housing G (the actual X-ray tube) and during operation of the X-ray emitter 4 an electron beam E is accelerated between the cathode and the anode and impinges onto the anode A. X-ray radiation R occurs there and the irradiating direction of the X-ray radiation depends on the impingement point on the anode A as is indicated by the two beam cones.

An effecting coil 14 (FFS magnetic coil 14) is arranged between the cathode K and the anode A so that the impingement point of the electron beam E on the anode A can be changed and the effect is a deflection of the electron beam E. If the effecting coil is influenced by the conductor arrangement L with a current, the effecting coil thus generates a magnetic field in which the electron beam E is deflected.

While the X-ray emitter is guided in the direction φ into an arc and the X-ray beam is irradiated in the direction r, the electron beam E can likewise be deflected or guided in the φ direction using the FFS magnetic coil 14. The directions are illustrated on the right-hand side edge, wherein it should be noted that it is a cylindrical coordinate system.

There are however further magnetic fields in the X-ray tube. For example, here a heating system H can produce a magnetic field for the cathode K and the magnetic field can disrupt the deflection of the electron beam E.

Figure 2:
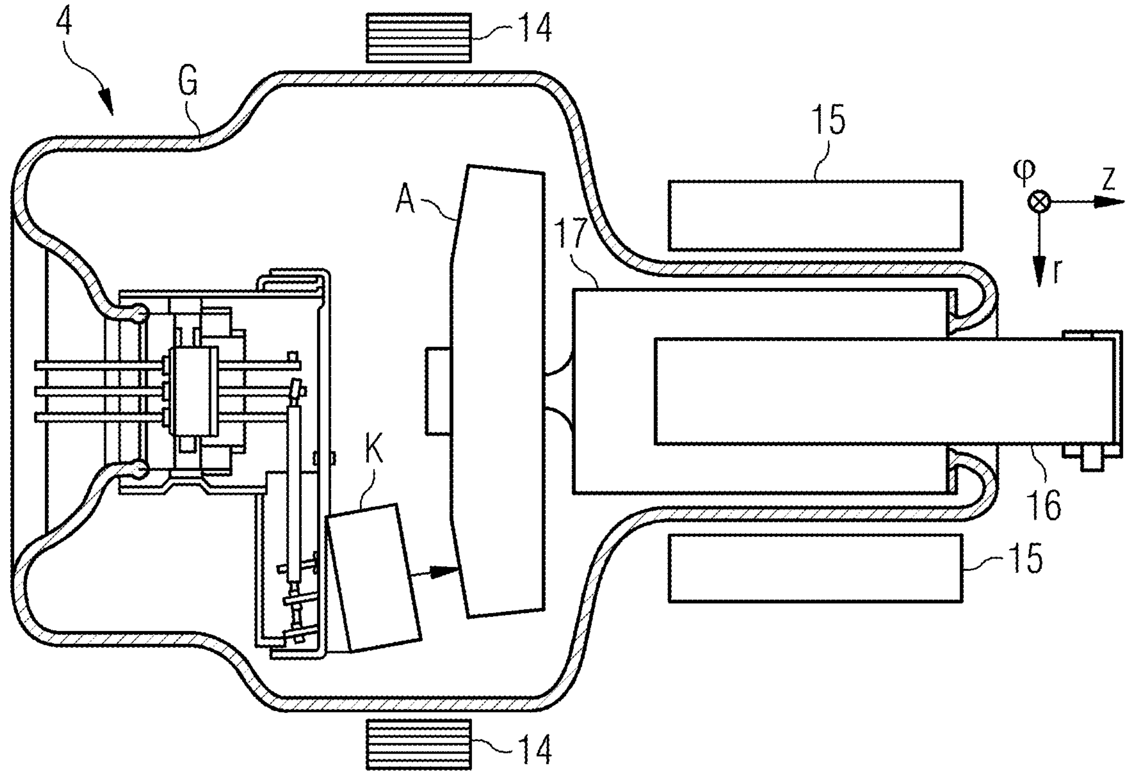
FIG. 2 shows a schematic illustration of an X-ray emitter having a rotary anode in accordance with the prior art.

FIG. 2 illustrates a schematic illustration of an X-ray emitter 4 having a rotary anode in accordance with the prior art. This X-ray emitter 4 is in principle built exactly like the X-ray emitter in FIG. 1 with the difference that here the anode A is rotated via a rotary anode drive 15 and that the FFS magnetic coil 14 is arranged outside on the housing G of the X-ray tube.

If the anode A is now rotated on the rotor 17 about the bearing 16 (as stator 16) of the anode, the rotary anode drive 15, which is essentially the coil arrangement of an electric motor, thus generates a periodic magnetic field that can disrupt the deflection of the electron beam E.

Figure 3:
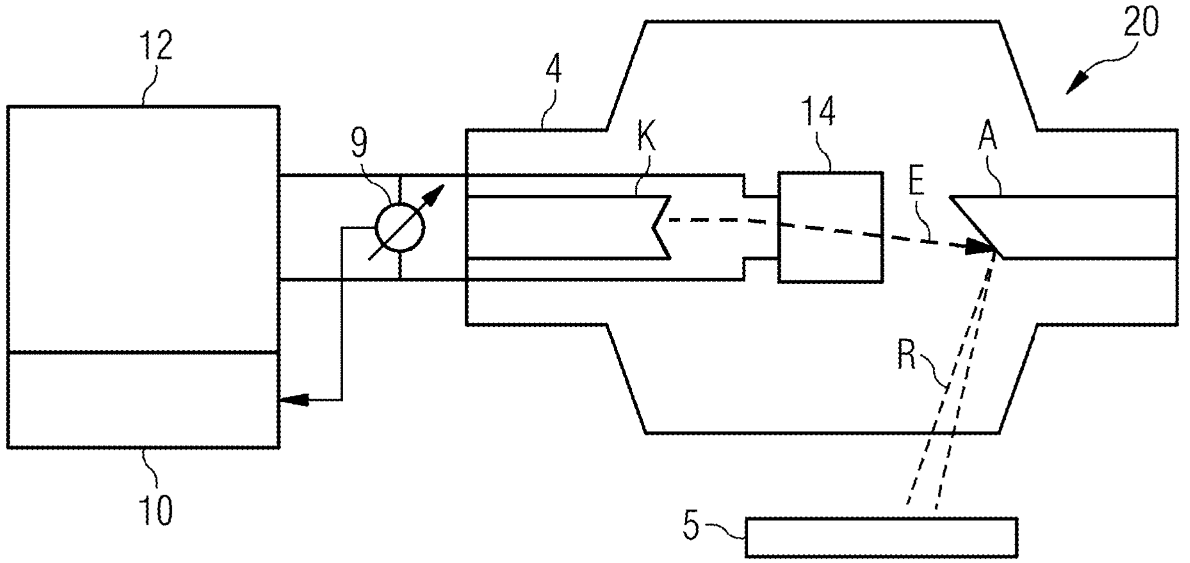
FIG. 3 shows an example for an X-ray emitter having a system in accordance with at least one example embodiment of the invention.

FIG. 3 illustrates an example for an X-ray emitter 4 having a system 20 in accordance with one or more example embodiments of the present invention. For example an X-ray emitter 4 according to FIG. 1 or 2 can be used as the X-ray emitter 4. An X-ray emitter 4 in accordance with one or more example embodiments of the present invention would comprise the system 20.

The system 20 here is connected to the FFS magnetic coil 14 via the conductor arrangement L, wherein the conductor arrangement L is also connected to a control facility 12 via which the deflecting current for the FFS magnetic coil 14 is applied. In the case that the control facility 12 would comprise the system 20, this would be a control facility 12 in accordance with one or more example embodiments of the present invention.

The measuring unit 9 at the conductor arrangement L measures the induction current SI that is induced in the coil 14 (cf. FIGS. 5 and 6) while in this case a current is not flowing through the coil 14.

The calibration unit 10 calculates from the measured induction current SI a compensation current SK for an effecting coil 14 (here the FFS magnetic coil 14 at which a measurement is also performed) so that this effecting coil can optimally deflect the electron beam E and the X-ray beam R of said electron beam optimally falls onto the detector 5. The method in this regard is illustrated more precisely in FIGS. 5 and 6.

The system can be coupled in a signal-technical manner to the control of a rotary anode drive 15, as is illustrated in FIG. 2, and can be designed so as to apply the compensation current Sk in a phase correct manner to the rotary anode drive 15.

Figure 4:
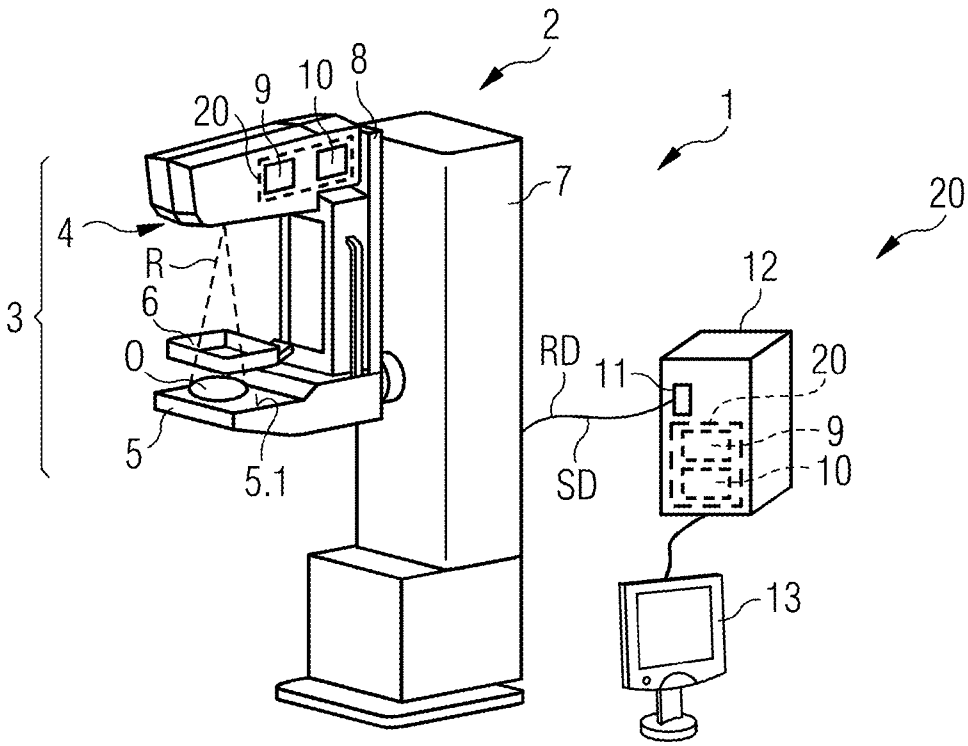
FIG. 4 shows a rough schematic illustration of a preferred tomosynthesis system having a preferred system according to at least one example embodiment.

FIG. 4 illustrates in an exemplary and roughly schematic manner a tomosynthesis system 1. Relative direction indications such as "upper", "lower" etc. relate to a tomosynthesis system 1 that is set up intentionally for operation. The tomosynthesis system 1 comprises a tomosynthesis device 2 and a control facility 12. The tomosynthesis device 2 has a stand column 7 and a source detector arrangement 3 that in turn comprise an X-ray emitter 4 and a detector 5 having a detector surface 5.1. The stand column 7 during operation stands on the ground. The source detector arrangement 3 is connected to the column in a displaceable manner with the result that the height of the detector surface 5.1, in other words the distance with respect to ground, can be set at a breast height of a patient.

A breast O of the patient (illustrated schematically here) lies on the upper side on the detector surface 5.1 as the object to be examined O for an examination. A plate 6 is arranged above the breast O and the detector surface 5.1 and the plate is connected to the source detector arrangement 3 in a displaceable manner. For the examination, the breast O is compressed and simultaneously fixed in that the plate 6 is brought down onto the breast with the result that a pressure is exerted onto the breast O between the plate 6 and detector surface 5.1.

The X-ray emitter 4 is arranged and designed opposite the detector 5 so that the detector 5 detects X-ray radiation R, which is emitted by the X-ray emitter, after at least a part of the X-ray radiation R has penetrated the breast O of the patient. In this case, the X-ray emitter 4 can pivot relative to the detector 5 via a rotary arm 8 in a region of ±50° about a base position in which it stands perpendicularly above the detector surface 5.1.

The control facility 12 obtains the raw data RD of the measurement and transmits control data SD to the tomosynthesis device 2 via a data interface 11. The control facility is connected to a terminal 13 via which a user can communicate commands to the tomosynthesis system 1 or can retrieve measurement results. The control facility 12 can be arranged in the same room as the tomosynthesis device 2, however the control facility can also be located in an adjoining control room or at a further spatial distance.

The system 20 in accordance with one or more example embodiments of the present invention (cf. FIG. 3) in this case is part of the X-ray emitter 4. The system can however also be part of the control facility 12 as is indicated with a dashed line.

Figure 5:
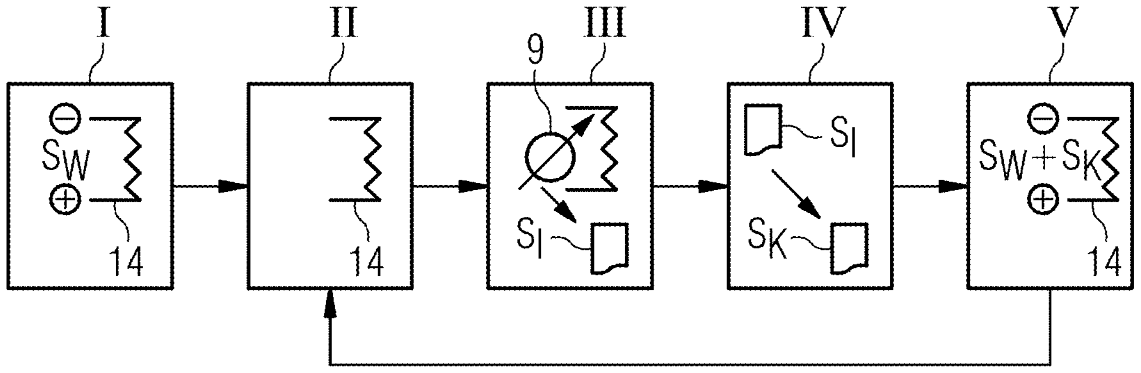
FIG. 5 shows a flow chart for a possible sequence of a method in accordance with at least one example embodiment of the present invention.

FIG. 5 illustrates a flow chart for a possible sequence of a method in accordance with one or more example embodiments of the present invention for calibrating an X-ray emitter 4 as is illustrated in the above figures. The coil 14 in this example is an effecting coil 14, for example the FFS magnetic coil 14 that is illustrated in the other figures. The coil can however also be a focusing coil. The coil 14 is connected to a conductor arrangement L via which in order to fulfill its primary function an electrical function current SW is guided through the coil 14.

In step I, it is illustrated how an effecting current SW is applied to the coil 14 as a function current SW.

In step III, this function current SW is switched off so that a current is no longer flowing through the coil 14.

Figure 6:
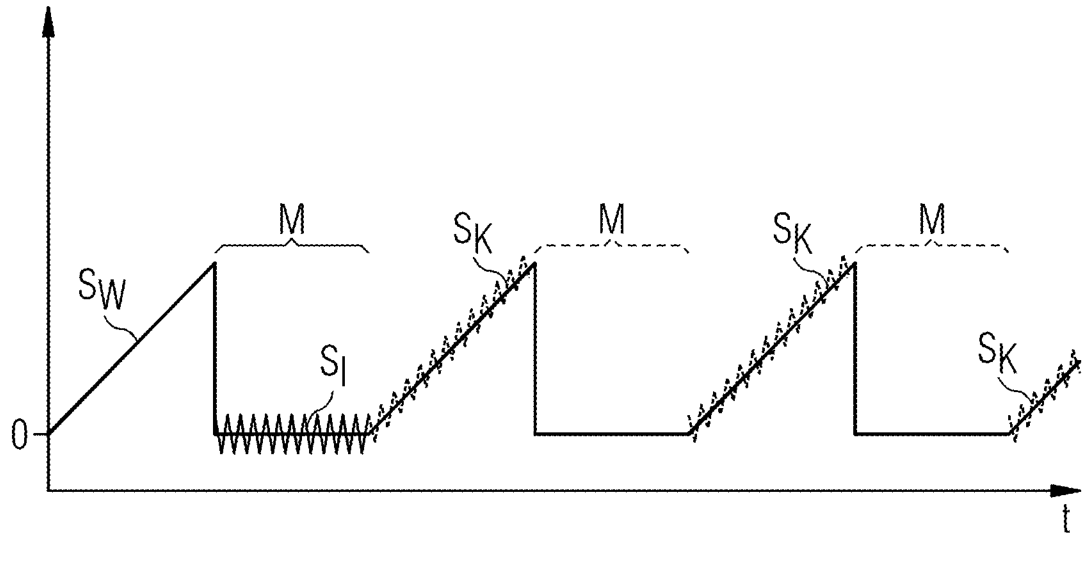
FIG. 6 shows an example for a graph of the currents according to at least one example embodiment.

The function current SW in this case is preferably applied and switched off periodically as is illustrated in FIG. 6, wherein, between switching off and applying the function current SW, a rest time exists in which a current is not flowing through the coil 14.

In step III, (in the switched off state of the coil 14) a measurement is performed (cf. in this regard also FIG. 6) of an induction current SI that is induced in the coil 14. The measurement in this case is performed on the conductor arrangement L of the coil 14.

In step IV, a calculation of a compensation current SK is performed for an effecting coil 14 of the X-ray emitter 4 (preferably the coil 14 at which the measurement has also been performed). The primary function of the effecting coil 14 in this case is to change an electron beam E between the cathode K and the anode A (for example the effecting coil 14 is the FFS magnetic coil that is illustrated in the other figures). The calculation is provided in this case based on the measured induction current SI, wherein the compensation current SK is calculated so that a magnetic field, which induced the induction current SI during the measurement, is compensated using the magnetic field that is produced by the compensation current SK in the effecting coil 14. In this example, in which the measurement has also been performed at the effecting coil 14, the compensation current SK is the inverted induction current SI.

In step V, the compensation current SK is applied in the effecting coil 14 together with its effecting current SW.

The method is then preferably implemented again after the effecting current SW is switched off as is indicated by the returning arrow.

FIG. 6 illustrates an example for a graph of the currents and is to illustrate the temporal curve of the application and measurement in accordance with the method of FIG. 5. For example, it can be a mammography examination in which a measurement is performed using a refresh rate of 5 images per second. The actual X-ray window in this case is only 100 ms long of the 200 ms per image recording. The detector is only ready in this time to detect X-ray radiation. In the remaining 100 ms X-ray radiation is not generated and consequently also an electron beam does not move from the cathode to the anode. The figure illustrates the sawtooth effecting current SW (here the deflecting current of an FFS magnetic coil 14), which decreases to zero between the image captures. The measurements of the induction current SI are performed at precisely these measuring times M. The compensation current SK (dotted line) is then calculated from the measured induction current SI and is applied together with the effecting current SW, for example as its modulation.

In conclusion, reference is once again made to the fact that the methods that are described in detail above and also the system that is illustrated are only exemplary embodiments that can be modified by the person skilled in the art in various ways without departing the scope of the invention. Furthermore, the use of the indefinite article "a" or "an" does not rule out that the relevant features can also be present multiple times. Terms such as "unit" likewise do not rule out that the relevant components are provided from multiple cooperating part components that where applicable can also be spatially distributed.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

We claim:

1. A method for calibrating an X-ray emitter having a cathode, an anode and a coil, wherein the coil is connected to a conductor arrangement through which an electrical function current is guided through the coil, the method comprising:

measuring an induction current that is induced in the coil at the conductor arrangement of the coil by an external magnetic field;

calculating a compensation current for an effecting coil of the X-ray emitter based on the measured induction current, the effecting coil configured to change an electron beam between the cathode and the anode, wherein the compensation current is calculated such that the external magnetic field that induces the induction current during the measuring is compensated using a magnetic field that is produced by the compensation current in the effecting coil; and applying the compensation current in the effecting coil.

2. The method of claim 1, wherein the measuring measures the induction current at the effecting coil while an effecting current is not flowing.

3. The method of claim 2, the measuring includes:

determining a phase of the induction current, and the applying applies the compensation current in synchronization with the determined phase.

4. The method of claim 2, further comprising:

periodically applying the effecting current by the coil, wherein the measuring measures the induction current during a rest time between the applying, and the calculating calculates the compensation current after the measuring and during the applying.

5. The method of claim 1, wherein the effecting coil is a flying focal spot (FFS) magnetic coil, the FFS magnetic coil is configured to deflect the electron beam and the calculating calculates the compensation current such that a magnetic field that induces the induction current in the FFS magnetic coil during the measuring is compensated using a magnetic field that is produced by the compensation current in the FFS magnet coil.

6. The method of claim 5, the measuring includes:

determining a phase of the induction current, and the applying applies the compensation current in synchronization with the determined phase.

7. The method of claim 1, wherein the effecting coil is a focusing coil, the focusing coil is configured to focus the electron beam, and the calculating calculates the compensation current such that a magnetic field that induces the induction current in the focusing coil during the measuring is compensated using a magnetic field that is produced by the compensation current in the focusing coil.

8. The method of claim 1, further comprising:

applying the compensation current with an effecting current in the effecting coil, wherein the effecting current excites the effecting coil.

9. The method of claim 1, further comprising:

periodically applying an effecting current by the coil, wherein the measuring measures the induction current during a rest time between the applying, and the calculating calculates the compensation current after the measuring and during the applying.

10. The method of claim 1, the measuring includes:

determining a phase of the induction current, and the applying applies the compensation current in synchronization with the determined phase.

11. The method of claim 9, the measuring includes:

determining a phase of the induction current, and the applying applies the compensation current in synchronization with the determined phase.

12. The method of claim 1, wherein the calculating calculates the compensation current during at least one of a production of the X-ray emitter, during an examination or between two examinations.

13. The method of claim 1, wherein an intensity of the compensation current is equal to an intensity of the induction current.

14. A system for calibrating an X-ray emitter having a cathode and an anode, the system comprising:

a conductor arrangement configured to connect to a coil such that a function current is guided through the coil;

a measuring unit configured to measure an induction current at the conductor arrangement, the induction current being induced in the coil that is connected to the conductor arrangement and being induced by an external magnetic field; and a calibration unit configured to calculate a compensation current for an effecting coil of the X-ray emitter based on the measured induction current, the effecting coil configured to change an electron beam between the cathode and the anode, wherein the compensation current is calculated such that the external magnetic field that induces the induction current during measurement of the induction current is compensated using a magnetic field that is produced by the compensation current in the effecting coil, and wherein a compensation unit is configured to apply the compensation current in the effecting coil.

15. The system of claim 14, wherein the effecting coil is between the cathode and the anode within or outside of a housing of the X-ray emitter.

16. The system of claim 14, wherein the effective coil is a focusing coil configured to focus the electron beam from the cathode to the anode.

17. The system of claim 14, wherein the conductor arrangement is configured to provide the measurement of the induction current, application of an effecting current and the application of the compensation current.

18. The system of claim 14, wherein the calibration unit is coupled in a signal-technical manner to a control of a rotary anode drive or the calibration unit is configured to measure rotation of the rotary anode drive, the calibration unit is configured to apply the compensation current in a phase-correct manner to the rotary anode drive.

19. An X-ray emitter or control facility comprising the system of claim 14.

20. An X-ray system comprising the system of claim 14.

* * * * *